US000001852H

United States Statutory Invention Registration [19]

[11] Reg. Number: H1,852

Alexander et al.

[45] Published: Jun. 6, 2000

[54] WASTE TREATMENT OF METAL PLATING SOLUTIONS

[75] Inventors: Celia L. Alexander, Salem; Anthony M. Mariniello, Peabody; Brian A. McBride, Charlestown; Michael M. Cook, Boxford, all of Mass.; David A. Dunn, Santa Ana, Calif.

[73] Assignee: Morton International Inc., Chicago, Ill.

[21] Appl. No.: 08/985,822

[22] Filed: Dec. 5, 1997

[51] Int. Cl.[7] ..... C02F 1/52

[52] U.S. Cl. ..... 210/710

[58] Field of Search ..... 210/725, 727, 210/719, 912; 204/DIG. 13

[56] References Cited

U.S. PATENT DOCUMENTS

| | | | |
|---|---|---|---|
| 3,770,630 | 11/1973 | Kamperman | 210/50 |
| 3,966,601 | 6/1976 | Stevenson et al. | 210/53 |
| 4,260,493 | 4/1981 | Kretas et al. | 210/714 |
| 4,303,704 | 12/1981 | Courduvelis et al. | 210/912 |
| 4,578,195 | 3/1986 | Moore et al. | 210/679 |
| 4,698,162 | 10/1987 | Guilbault et al. | 210/710 |
| 4,814,091 | 3/1989 | Napier et al. | 210/665 |
| 4,943,377 | 7/1990 | Legare, III | 210/709 |
| 4,954,265 | 9/1990 | Greenberg et al. | 210/710 |
| 4,956,097 | 9/1990 | Courduvelis | 210/718 |
| 4,957,634 | 9/1990 | Bowers, Jr. | 210/711 |
| 4,971,775 | 11/1990 | Hoy et al. | 423/140 |
| 4,975,203 | 12/1990 | Cook et al. | 210/716 |
| 5,045,213 | 9/1991 | Bowers | 210/709 |
| 5,108,620 | 4/1992 | Wester et al. | 210/725 |
| 5,264,135 | 11/1993 | Mohn | 210/710 |
| 5,277,817 | 1/1994 | Martyak et al. | 210/912 |
| 5,354,478 | 10/1994 | Ulman et al. | 210/716 |
| 5,360,551 | 11/1994 | Weber | 210/719 |
| 5,387,365 | 2/1995 | Moriya et al. | 252/180 |
| 5,500,133 | 3/1996 | Carey et al. | 210/729 |
| 5,523,002 | 6/1996 | Carey et al. | 210/728 |
| 5,632,901 | 5/1997 | Engström | 210/724 |

OTHER PUBLICATIONS

Product Brochure, *VenMet® Solution*, Morton International, Inc. (1990).

M. Aleksinas, *Waste Treatment of Electroless Nickel In The 90's*, Electroless Nickel Conference (1993).

P. Fallon, *Recycle of Spent Electroless Nickel*, Electroless Nickel Conference (1993).

*Primary Examiner*—Charles T. Jordan
*Assistant Examiner*—Meena Chelliah
*Attorney, Agent, or Firm*—Gerald K. White; Steven C. Benjamin

[57] ABSTRACT

An efficient and economical process for the waste treatment of spent metal plating solutions, primarily spent electroless nickel solutions, to significantly reduce the metal content therein, so as to permit direct discharge to municipal water systems without violation of the law. The waste treatment process is a sequential two-step chemical precipitation process, whereby the dissolved metal content is precipitated first by sodium borohydride reduction, followed by sodium dimethyldithiocarbamate precipitation, with an intermediate filtration step and pH adjustment step interposed there between. The amount of metal-bearing sludge produced is minimal. Furthermore, the bulk of the metals in the sludge may be recovered and reused, resulting in significant reduction in hazardous waste disposal costs.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WASTE TREATMENT OF METAL PLATING SOLUTIONS

FIELD OF THE INVENTION

This invention relates to a process for the waste treatment of metal-bearing solutions to substantially eliminate the dissolved metal content in such solutions prior to discharge to the environment and, more particularly, to a process for the waste treatment of spent metal plating solutions which will enable such solutions to be discharged as non-toxic waste directly to a municipal wastewater treatment plant.

BACKGROUND OF THE INVENTION

Solutions capable of plating metals onto substrates are widely used in industry. The most commonly used metal plating solutions include electrolytic and electroless solutions.

Electroless nickel plating solutions, in particular, have come into widespread usage in the manufacture of computer memory discs. Such solutions generally contain a nickel metal salt, such as the sulfate, acetate, carbonate or chloride salt, for the source of dissolved metal plating ions, a reducing agent, such as sodium hydrosulfite, sodium hypophosphite, sodium borohydride, boranes or hyrdazines, to reduce the metal ions to metallic form, a complexing or chelating agent, such as monocarboxylic acids, dicarboxylic acids, hydroxycarboxylic acids, amino acids, and alkanolamines, to maintain the metal ions in solution and prevent premature precipitation, and a pH adjuster to maintain the solution pH typically within an acidic range of 4–5. Accelerators, stabilizers, buffers, and wetting agents may also be included in the electroless nickel solutions.

These electroless nickel solutions only have a limited useful life and eventually become depleted or spent. Typically, after a limited number of plating cycles, the concentration is reduced of both the complexed metal in solution (by plate-out onto the substrate) and the reducing agent (by consumption according to the chemical reaction controlling plating) to where the plating rate of the electroless bath is slowed sufficiently to become unsatisfactory, and the bath has to be discarded.

Disposal of such spent electroless nickel solutions, however, presents a major problem, since a large percentage of the original complexed nickel content remains dissolved in the spent solutions. From an environmental standpoint, it is well known that heavy metal ions and particularly those of the metal here of interest, namely nickel, can have adverse toxic effects on the environment if directly discharged in soluble form into effluent wastewater streams that feed into municipal water systems or natural bodies of water. Also, such highly chelated streams generally cannot be mixed with unchelated streams at the wastewater treatment plant, making processing much more difficult. As a result, discharging dissolved heavy metals, including nickel, directly into effluent wastewater streams, in other than minute quantities, is prohibited by local, state, and federal regulations.

A number of wastewater treatment processes have been proposed to reduce the metal content in spent electroless solutions to low levels prior to discharge. Previously, many users of electroless baths simply dosed their wastes with caustic soda to precipitate the bulk of the heavy metal contaminant as insoluble hydrous oxides (metal hydroxides), whereupon the hydrous oxide sludge was pressed into a filter cake, drummed, and disposed. This method of metal removal, however, was known to produce a very large quantity of metal-bearing sludge, all of which needed to be disposed of in approved hazardous landfills. Sludge disposal is very expensive, environmentally detrimental, wasteful of natural resources, and involves compliance with local, state and federal regulations. In addition, the sludge producer assumes perpetual liability for the sludge deposited in the landfill site which is undesirable. Another problem with this treatment method is that it is inefficient and generally did not work well due to the high chelant levels in the spent solutions.

Another waste treatment method previously used for spent electroless solutions was to simply electrolessly plate out the metal by dosing the solution at slightly alkaline pH with reducing agents. The reducing agents typically used to convert the dissolved metal salt into insoluble metal precipitate include sodium borohydride, sodium hydrosulfite, sodium hypophosphite, boranes and hydrazines. An advantage of this method is that the metal-bearing sludge produced contains high levels of elemental metal which can be reclaimed by smelting and sold at a profit. Therefore, hazardous waste disposal of the sludge is no longer required. Plainly, this method is economical, environmentally friendly, and conserves natural resources. One drawback, however, is that the soluble nickel content in the treated electroless nickel baths can only be partially reduced. Generally, the nickel content can only be lowered to about 3–70 parts per million (ppm) which no longer meets the discharge limits in most jurisdictions.

Still another prior waste treatment method known for reducing the dissolved metal content of spent electroless baths to acceptable discharge levels involves organosulfur precipitation of the metal by dosing the spent solution at a pH of 5–8 with water-soluble sodium dithiocarbamate (DTC) precipitating agents, such as sodium dimethyldithiocarbamate (DTC-Na). The dissolved metal salt complexes with the soluble dithiocarbamate salts to form insoluble metal dithiocarbamate precipitates. The metal dithiocarbamate particles are generally very fine and not conducive to settling, and typically require the aid of coagulants and flocculants to form larger, faster settling flocs which are more capable of removal by filtration. The dithiocarbamate method effectively removes the heavy metal content in spent electroless baths to non-detectable levels, but undesirably produces huge quantities of heavy metal-bearing carbamate sludge which create potentially dangerous hydrolytic loading on the typical liquid-solid system. Furthermore, these sludges must be classified as hazardous waste and disposed of predominantly in approved hazardous landfills. Here again, sludge disposal is very expensive, environmentally detrimental, and wasteful of natural resources.

Prior attempts to waste treat spent electroless nickel solutions with borohydride reduction followed by dithiocarbamate precipitation without removing the reduction precipitants or lowering the pH prior to dithiocarbamate precipitation have generally been met without much success. With the combined method, no appreciable differences in the nickel levels have been shown over straight borohydride reduction, which levels fall above current discharge limits.

While the prior processes reduce the metal content of the spent electroless plating solutions, the need still exists for efficient and economical methods for waste treating such solutions which also meet current discharge limits in the low parts per million without simultaneously generating significant amounts of hazardous waste. Moreover, as the regulatory rules for waste stream effluent discharge limits become more stringent, such as to certain fractional parts per million, a search for improved processes to remove the metal content becomes mandatory.

SUMMARY OF THE INVENTION

It is an object of this invention, therefore, to provide an efficient and economical process for the waste treatment of metal-bearing waste solutions, particularly spent electroless nickel plating solutions that contain dissolved nickel, sometimes other metals, and complexing agents, to substantially remove the dissolved metal content therein, so as to leave the treated solutions classifiable as non-polluting waste by law and suitable for discharge directly to a municipal wastewater treatment plant or a natural body of water.

It is another object of this invention to provide a waste treatment process that is simple in operation and employs an effective, sequential, two-step chemical treatment method involving chemical reduction, particularly borohydride reduction, followed by organosulfur precipitation, particularly dithiocarbamate precipitation, and that surprisingly meets current discharge limits.

It is a yet another object of this invention to provide a waste treatment process that generates reduced amounts of hazardous sludge, resulting in a significant reduction in hazardous waste disposal costs.

Yet another object of this invention is to provide a waste treatment process which conserves natural resources by generating, for the most part, a sludge containing high levels of solid metal compounds, including elemental metal ore, which can be recovered and reclaimed, rather than disposed of as a hazardous waste.

Still another object of this invention is to provide a waste treatment process which reduces the dissolved metal content down to the low parts per million and, in most cases, down to fractional parts per million.

And still another object of this invention is to provide a waste treatment process which can treat multiple metal-bearing wastewater streams, which previously required separate treatments.

Yet another object of this invention is to provide an apparatus suitable for use in performing such a waste treatment process.

In accordance with this invention, a process is provided for the waste treatment of metal-bearing wastewater solutions containing dissolved chelated or non-chelated metals, particularly electroless nickel plating solutions, whereby the treated solution can be discharged directly to a municipal wastewater treatment plant or to the environment. Broadly stated, the process comprises the sequential steps of chemical reduction, followed by organosulfur precipitation, with an intermediate filtration step and pH adjustment interposed there between. In a preferred embodiment, the first step comprises borohydride reduction and the second step comprises dithiocarbamate precipitation. The heavy metal content in the precipitated matter produced in the first stage of this process can ultimately be recovered as metal, essentially eliminating the need for large volumes of hazardous waste disposal.

The various objects, features and advantages of this invention will become more apparent from the following description and appended claims.

BRIEF DESCRIPTION OF THE DRAWINGS

With this description of the invention, a detailed description follows with reference made to the accompanying drawing in which.

DETAILED DESCRIPTION OF THE PREFERRED EMBODIMENTS OF THE INVENTION

Figure 1:
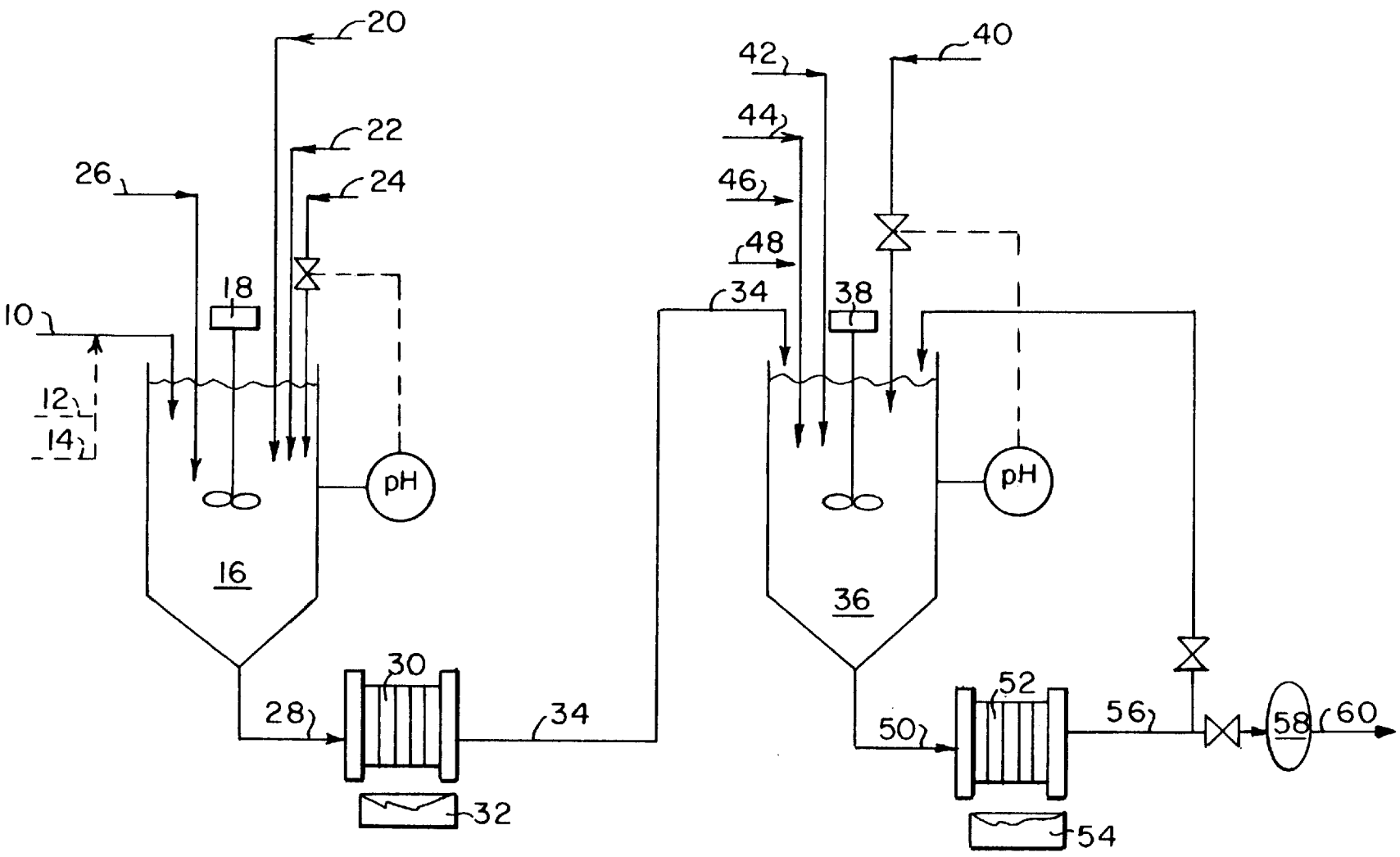
FIG. 1 represents a flow chart showing the currently preferred process and apparatus for waste treatment of spent electroless nickel solutions in accordance with this invention.

This invention provides a sequential, two-step, simple, efficient, economical, and environmentally favorable, waste treatment process for metal-bearing wastewater solutions, particularly spent electroless nickel plating solutions, which can lower the dissolved metal content in such solutions to acceptable levels, generally on the order of about ca. $\leqq 3$ ppm and preferably ca. $\leqq 0.5$ ppm, so that the solutions can be discharged directly into a wastewater treatment plant stream or a natural stream.

The metal-bearing solutions to be waste treated may come form a variety of sources such as metal process streams from mining and metallurgical operations, electrolytic and electroless metal plating baths, other metal recovery operations, such as ion exchange, and chemical manufacture, and the like. Metal-bearing solutions containing heavy metals, such as nickel, copper, cobalt, silver, gold, lead, mercury, platinum, and any other metals reduced or precipitated by alkali metal borohydrides may be treated according to this invention. Such metals can be found throughout the transition metals, lanthanides, actinides, and post-transition metals. Other metal-bearing solutions that contain heavy metals, such as zinc, which are not reduced by alkali metal borohydrides but can be precipitated by alkali thiocarbamates may also be treated according to this invention. However, the invention is particularly effective in treating metal-bearing waste solutions containing dissolved nickel. Thus, for convenience, the following description of this invention will be directed to the treatment of discarded or spent electroless nickel plating solutions.

Spent electroless nickel solutions to be treated usually contain substantial quantities of dissolved nickel. In general, the dissolved nickel content can vary within very wide limits dependent upon the source of the specific solution treated. For purposes of illustration only, the nickel content of a conventional spent electroless nickel solution to be treated in accordance with this invention usually varies between about 4,000–6,000 ppm (4–6 grams/liter). Consequently, a successful waste treatment process permitting direct disposal of the solution to the environment should comprise lowering the dissolved metal content in the solution to non-toxic discharge levels generally on the order of ca. $\leqq 3$ ppm Ni, and preferably ca. $\leqq 0.5$ ppm.

The waste treatment process of this invention is amenable to batchwise or continuous processing, although batchwise processing is presently preferred.

In accordance with this invention, the first step in the waste treatment of the spent electroless nickel plating solution is removal of the dissolved metal from solution by chemical reduction, particularly borohydride or borohydride catalyzed reduction. The spent electroless solution to be waste treated is first contacted with a reducing agent for a sufficient time to cause the dissolved metal salt to undergo chemical reduction, resulting in the precipitation of metal compounds out of the solution. A preferred method for accomplishing this is by the addition of an alkali or alkaline earth metal borohydride, preferably sodium borohydride from an economic standpoint, to the spent electroless nickel solution. The sodium borohydride is usually added as an aqueous solution of sodium borohydride and sodium hydroxide (for hydrolytic stability of the borohydride ion and reduction of hydrogen gas evolution). An example of a suitable hydrolytically stabilized borohydride reduction solution is sold under the trademark VenMet® by Morton International, Inc. of Chicago, Ill.

The amount of sodium borohydride solution used will vary depending upon the particular system for which treatment is desired and will mainly be influenced by the metal content of the waste solution and the presence of other ligands and chelant molecules.

Although stoichiometric quantities of sodium borohydride vis-a-vis the dissolved metal content may be employed, it is generally preferred to employ a stoichiometric excess amount of sodium borohydride to compensate for consumption during competing oxidative side reactions. Normally, the sodium borohydride solution is added in a sufficient amount to provide at least about 4 to 15 times the amount of sodium borohydride required to reduce the waste metal in the spent electroless nickel solution. In some cases less than stoichiometric levels of borohydride can be employed as the borohydride reduced nickel often catalyzes additional hypophosphite reduction of the chelated nickel ions in solution.

Adjustment of the pH of the electroless nickel solution before the addition of sodium borohydride is generally desired to maximize the rate of sodium borohydride reduction. For systems in which the primary metal ion is nickel, the borohydride reduction can be carried out in a pH range of between about 4 and 11 and preferably in a range of between 7 and 11. The pH adjustment is typically accomplished with the addition of sufficient quantities of alkaline agents, such as sodium hydroxide, calcium hydroxide, magnesium hydroxide, and lime, or mixtures thereof, to the electroless nickel solution before the addition of the sodium borohydride solution. Normally between about 200 and 2,000 ppm of lime is employed and then final pH adjustment is made to the solution.

It may also be desirable to add sufficient amounts of oxidizer scavenging agents, such as sodium bisulfite, sodium metabisulfite, and sodium sulfite, or mixtures thereof, to the reaction mixture in order to minimize consumption of the sodium borohydride prior to metal reduction. This material is typically added to the spent solution at a low solution pH of about 4–5 prior to final pH adjustment. Normally between about 200 and 2,000 ppm of bisulfite is employed in this first treatment stage.

The treated solution is allowed to settle and the nickel-bearing precipitate which results from such treatment is separated from the treated electroless solution by conventional solid-liquid separation techniques, such as decantation or filtration. It should be understood that in order to run the process of this invention in an effective manner, the inventors have found that it is critical to separate the precipitated matter from the treated liquid prior to the subsequent chemical treatment of the liquid. Typically, the precipitate is allowed to settle and is then withdrawn from the bottom of the reaction vessel as a sludge. The sludge is then passed through a filter press to separate the precipitate as a filter cake from the treated liquid. The filter cake which contains high levels of metallic nickel compounds is desirably transported to a smelting operation to recover elemental nickel which can be reused in various chemical processes, instead of being disposed as hazardous waste in a landfill.

The dissolved nickel content in the essentially precipitate-free treated solution following borohydride reduction is typically between about ca. 3–70 ppm.

Following chemical reduction, the second step in the sequential treatment process of this invention is the removal of substantially all of the remaining dissolved metal content from the treated solution by organosulfur precipitation, particularly thiocarbamate precipitation. As mentioned above, the solution prior to this treatment stage is essentially free of precipitated matter generated from the first treatment stage. This prevents the reduction precipitate from interfering with the subsequent thiocarbamate precipitation, and allows for direct contact between the precipitating agent and the remaining nickel in the treated solution. Furthermore, cross-contamination of precipitates is eliminated, which preserves the high purity of the reduction precipitate.

In the second stage, the treated electroless solution is contacted with an organosulfur precipitating agent, such as a thiocarbamate, for a sufficient time to form an insoluble metal organosulfur precipitate. A convenient method for accomplishing this is by the addition of a water-soluble alkali and alkaline earth metal polythiocarbamate to the treated electroless nickel solution. Examples of particularly useful water-soluble alkali metal polythiocarbamates include sodium dimethyldithiocarbamate, sodium diethydithiocarbamate, sodium trithiocarbamate, and the like. Generally, the alkali metal dialkyldithiocarbamates are most desirable, particularly sodium dimethyldithiocarbamate. Specific examples of sodium dimethyldithiocarbamates are those sold under the trademark Metal Plex™ 143 by Morton International, Inc. of Chicago, Ill.

Although stoichiometric amounts of the sodium thiocarbamate vis-a-vis the metal content may be employed, it is generally preferred to employ a stoichiometric excess of this precipitating agent. Generally, the sodium thiocarbamate is used in an amount sufficient to provide at least about 20 times the amount required to precipitate the waste metal as insoluble nickel thiocarbamate complexes.

Adjustment of the solution pH before precipitation is effected is generally desired. The pH of the electroless solution is typically lowered to between about 5–8 prior to the addition of the thiocarbamate precipitating agent with appropriate pH adjusters, such as nitric acid, sulfuric acid, acetic acid, or hydrochloric acid. It is also possible to adjust the pH with spent acid process solutions which may or may not contain additional metals. It is particularly desirable to employ spent acid solutions, such as those derived from the plating process, in this stage of the waste treatment. This eliminates the need to treat such solutions in a separate waste treatment process.

The metal thiocarbamate precipitates usually form a very fine floc which is not conducive to settling at an appreciable rate and filtration. Thus, it is generally desirable to add both coagulation and flocculation agents to the precipitate for more efficient removal. Suitable flocculation agents useful herein include anionic polymers, such as anionic polyacrylamides. An example of a flocculation agent based on an anionic polyacrylamide is sold under the trademark Meta-Floc™ 495 by Morton International, Inc. of Chicago, Ill. Suitable coagulation agents include cationic polymers, such as cationic polyquarternary amines and cationic polyacrylamides. An example of a coagulation agent based on cationic polyquarternary amine is sold under the trademark MetaFloc™ 137 by Morton International, Inc. of Chicago, Ill. It is generally desirable to first add from about 50 to 300 ppm of the cationic polymer to the reaction mixture to coagulate the precipitated particulates, followed by the addition of from about 1 to 10 ppm of the anionic polymer to bridge the coagulated particulates together to form larger, faster settling flocs. Usually, it is also desirable to add between about 400 and 2,400 ppm of dry diatomaceous earth to the reaction mix. The diatomite acts as a filtering aid by further building-up the size of the particulates.

The treated solution is allowed to settle and the nickel-bearing precipitate which results from the second stage of the treatment is separated from the electroless solution by conventional solid-liquid separation techniques, such as decantation or filtration. Typically, the precipitated floc is allowed to settle and is then withdrawn from the bottom of the reaction vessel as a sludge. The sludge is then transported to a filter press to separate the precipitate as a filter cake from the treated liquid. The filter cake containing the insoluble nickel thiocarbamate complex can either be mixed with the sludge produced from the first step and smelted together, or discarded separately as hazardous waste in a landfill. Since the amount of sludge produced from the second step is minimal, even if it is required to dispose of the sludge as hazardous waste due to the presence of metal thiocarbamates, the hazardous waste disposal costs are minimized. The two-step treated liquid can then be pumped directly to a municipal wastewater treatment facility or a natural stream. It is usually desirable to filter the treated liquid prior to discharge, since residual particulates may be present in the liquid extracted from the filter press.

The nickel content in the electroless nickel solution following thiocarbamate precipitation and prior to discharge is typically about ca. ≦3 ppm Ni and more typically about ca. ≦0.5 ppm.

In accordance with this invention, the inventors have also surprisingly found that incorporation of other metal removal process waste streams, such as zincate waste (a zinc caustic solution) and ion exchange regenerate waste (a nickel acidic solution), into the spent electroless nickel feed solutions can be accomplished without adversely affecting the final nickel levels. The addition of both acidic and basic metal-bearing streams into the electroless nickel does not alter the pH enough to require additional steps and/or caustic prior to chemical reduction. This ability to incorporate additional waste streams into the electroless nickel treatment eliminates the need for separate treatments for each stream and associated costs. Sludge generation is also significantly reduced as a result.

With reference to FIG. 1, the following is a preferred listing of processing steps for waste electroless nickel solutions utilizing the process of this invention. It is understood that the exact steps will vary depending on the nature of the waste stream and the equipment being used in the treatment system. A waste electroless nickel solution 10, along with optional zincate waste solution 12 and optional ion exchange regenerate waste solution 14, is fed at room temperature to a first reaction vessel 16 equipped with a stirrer 18. Under agitation, sodium metabisulfite 20 and lime 22 to facilitate reduction and filtration are added and the pH of the solution is then raised to the 7–11 range with the addition of sodium hydroxide 24. Still under agitation, excess stabilized sodium borohydride reduction solution 26 (VenMet® solution) is added. Agitation is continued until substantial completion of the borohydride reduction reaction. The borohydride reduction reaction can be represented by the following equation:

$$8Ni^{+2}X+NaBH_4+2H_2O \rightarrow NaBO_{2+8}HX+8Ni^0_{(s)}$$

where X=the anion (chloride, sulfate, carbonate, acetate). After completion, the agitation is discontinued and the solid precipitate is allowed to settle as a slurry or sludge 28. The sludge 28 can be drawn off the bottom of the reaction vessel 16 and fed to a filter press 30 where the treated liquid is separated from the solid precipitate. The filter cake 32 which contains high concentrations of solid nickel compounds is drummed and set aside for subsequent nickel recovery by a smelting operation (not shown).

Next, the treated liquid 34 containing substantially reduced levels of nickel and being essentially free of solids is then fed at room temperature to a second reaction vessel 36 equipped with a stirrer 38. Under agitation, nitric acid 40, which may be drawn from a spent acid stream, is added to lower the pH of the solution to within the range of 5–8. Still under agitation, excess sodium dimethyldithiocarbamate 42 (Metal Plex™ 143) is added. Agitation is continued until substantial completion of the organosulfur precipitation reaction.

The organosulfur precipitation reaction is represented by the following equation:

$$2DTC\text{-}Na+Ni^{+2}(complexed) \rightarrow 2DTC\text{-}Ni_{(s)}.$$

After completion, still under agitation a coagulant 44 (MetaFloc™ 137) is added and mixed until sufficient coagulation, then a flocculant 46 (MetaFloc™ 495) is added and mixed until sufficient flocculation, and lastly sufficient dry diatomaceous earth 48 is added and mixed until the desired build-up of the precipitate is complete. The agitation is then discontinued and the solid organosulfur precipitate is allowed to settle as a slurry or sludge 50. The sludge 50 can then be drawn off the bottom of the reaction vessel and fed to a filter press 52 where the treated liquid is separated from the solid precipitate. The filter cake 54 containing essentially all remaining nickel is minimal and can be combined with the filter cake 32 that resulted from the borohydride treatment. The treated liquid 56 is then fed through a filter 58 (0.2 micron filter) to ensure removal of any residual solid particulates from the solution. Also, as shown in FIG. 1, at start-up the treated liquid 56 may be returned back to the second reaction vessel 36 instead of being initially passed through the filter 58 to prevent unwanted clogging of the filter. The filtered liquid 60 can then be safely discharged directly into a wastewater treatment plant stream or a natural stream (not shown).

The following non-limiting examples will now illustrate the effectiveness of the process of this invention in rendering metal-bearing solutions safe for discharge.

EXAMPLE 1

Waste Treatment of Spent Electroless Nickel Solution 500 mL of spent electroless nickel solution was placed in a beaker with a magnetic stir bug. 250 ppm $Na_2S_2O_5$ was added to the electroless nickel solution. The pH of the solution was then raised from pH 5 to 10.5 with 500 ppm of lime and 50% NaOH solution. 6 mL of VenMet® reduction solution (12 mL/L) was placed in a small beaker and diluted approximately 2:1 with water. The diluted VenMet® solution was poured directly into the pH adjusted electroless nickel solution. The small beaker was rinsed once with water and the rinse was also poured into the electroless nickel solution. Using moderate agitation the solution was mixed for 4 hours. After the 4 hours the electroless nickel solution was removed from agitation and filtered through a #4 Whatman® filter paper to remove the solids. The pH of the solution was then lowered to pH 7 with 35% nitric acid solution. 4 mL of Metal Plex™ 143 (20 mL/L) was added to the reduced and filtered solution. This was allowed to mix for 1 hour using moderate agitation. After the 1 hour 100 ppm of MetaFloc™ 137 was added to the solution and allowed to mix for 10 minutes. Then 2 ppm of MetaFloc™ 495 was added and allowed to mix for 10 minutes. Lastly, 2 mL (dry) diatomaceous earth (10 mL/L) was added and allowed to mix for 10 minutes. The treated solution was then filtered through a 0.2 $\mu$m syringe filter for analysis. The final nickel content in the treated solution was ca. <0.1 ppm.

EXAMPLE 2

Waste Treatment of Combined Spent Electroless Nickel and Zincate Waste Solutions 450 mL of spent electroless nickel solution was placed in a beaker with a magnetic stir bug. 50 mL of waste zincate solution was also placed into the beaker. The pH of the solution was then raised from pH 5.6 to 10.5 with 50% NaOH solution. 6 mL of VenMet® reduction solution (12mL/L) was placed in a small beaker and diluted approximately 2:1 with water. The diluted VenMet® solution was poured directly into the pH adjusted electroless nickel solution. The small beaker was rinsed once with water and the rinse was also poured into the electroless nickel solution. Using moderate agitation the solution was mixed for 4 hours. After the 4 hours the solution was removed from agitation and filtered through a #4 Whatman® filter paper to remove the solids. The pH of the solution was then lowered to pH 8 with 35% nitric acid solution. 10 mL of Metal Plex™ 143 (50 mL/L) was added to the reduced and filtered solution and allowed to mix for 1 hour using moderate agitation. After the 1 hour 100 ppm of MetaFloc™ 137 was added to the solution and mixed for 10 minutes. Then 2 ppm of MetaFloc™ 495 was added and mixed for 10 minutes. Lastly, 2 mL (dry) diatomaceous earth (10 mL/L) was added and mixed for 10 minutes. The treated solution was then filtered through a 0.2 $\mu$m syringe filter for analysis. The final nickel content in the treated solution was ca. <0.1 ppm and the final zinc content in solution was ca. 0.16 ppm.

The overall efficiency, simplicity, economic and ecological gains, and legal benefits which contribute to making the process of this invention most desirable for removing dissolved heavy metals from metal-bearing solutions should now be apparent to persons skilled in the art.

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A process for the waste treatment of a metal-bearing waste solution to reduce the dissolved metal content prior to discharge, comprising the sequential steps of contacting the solution with a reducing agent for a sufficient time to precipitate a substantial portion of said dissolved metal content by chemical reduction, followed by contacting said solution with a precipitating agent for a sufficient time to precipitate substantially all of the remaining dissolved heavy metal content by organosulfur precipitation, then separating the precipitated metal compounds from the treated solution, and finally discharging the treated solution into a waste stream, wherein prior to organosulfur precipitation an intermediate separation is performed to remove substantially all of the reduction precipitate from said solution.

2. The process of claim 1, wherein said reducing agent comprises sodium borohydride.

3. The process of claim 1, wherein said precipitating agent comprises sodium dimethyldithiocarbamate.

4. The process of claim 1, wherein said metal-bearing waste solution comprises one or more solutions including at least a spent electroless nickel plating solution.

5. A process for the waste treatment of a spent metal plating solution to reduce the dissolved metal content to dischargeable levels, comprising sequentially contacting said solution with a borohydride reducing agent for a sufficient time to precipitate a substantial portion of the dissolved metal content in said solution, intermediately separating the reduced metal precipitate from said solution, followed by contacting said solution with a thiocarbamate precipitating agent for a sufficient time to precipitate substantially all of the remaining dissolved metal content in said solution, separating the precipitated metal thiocarbamates from said solution, and finally discharging said solution directly into a waste stream.

6. The process of claim 5, wherein said borohydride reducing agent comprises sodium borohydride.

7. The process of claim 5, wherein said thiocarbamate precipitating agent comprises sodium dimethyldithiocarbamate.

8. The process of claim 5, wherein said process is run in a batchwise manner.

9. The process of claim 5, wherein said process is run in a continuous manner.

10. The process of claim 5, wherein said metal plating solution comprises a spent electroless nickel plating solution.

11. The process of claim 5, wherein the metal contained in said reduced metal precipitate is recoverable.

12. The process of claim 5, wherein the pH of said solution is adjusted to between about 4 and about 11 prior to borohydride reduction.

13. The process of claim 5, wherein the pH of said solution is adjusted to between about 5 and about 8 prior to thiocarbamate precipitation.

14. The process of claim 5, wherein said metal thiocarbamate precipitates are contacted with a filtering aid selected from the group consisting of coagulants, flocculants, and diatomaceous earth, to facilitate subsequent separation.

15. The process of claim 5, wherein prior to borohydride reduction, sodium metabisulfite and lime are added to said solution to facilitate reduction and intermediate separation.

16. The process of claim 5, wherein said borohydride reducing agent and said thiocarbamate precipitating agent are each provided in excess of stoichiometric amount based on the dissolved metal content of said solution.

17. The process of claim 10, wherein the discharged solution contains less than 3 ppm dissolved nickel content.

18. The process of claim 10, wherein the discharged solution contains less than 0.5 ppm dissolved nickel content.

19. A process for the waste treatment of a spent electroless nickel plating solution to reduce the dissolved nickel content to dischargeable levels, comprising adjusting the pH of said solution to between about 7 and 11, contacting said solution with excess sodium borohydride reducing agent for a sufficient time to precipitate a substantial portion of the dissolved nickel content in said solution, intermediately separating the reduced nickel precipitate from said solution, pH adjusting said solution to between about 5 and 8, followed by contacting said solution with excess sodium dimethyldithiocarbamate precipitating agent for a sufficient time to precipitate substantially all of the remaining dissolved nickel content in said solution, contacting said solution with a filtering aid selected from the group consisting of coagulants, flocculants, and diatomaceous earth, separating the precipitated metal thiocarbamates from said solution, and finally discharging said solution directly into a waste stream.

20. The process of claim 19, wherein prior to borohydride reduction, an oxidizer scavenging agent and lime are added to said solution to facilitate reduction and intermediate separation.

* * * * *